(No Model.)
G. M. WEEKS.
COVER OR STOPPER FOR MILK CANS, &c.
No. 536,903.  Patented Apr. 2, 1895.
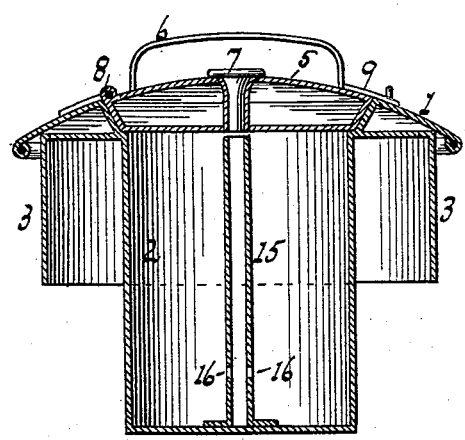
WITNESSES:
INVENTOR:
Grenville M. Weeks
BY
ATTORNEYS.

UNITED STATES PATENT OFFICE.

GRENVILLE M. WEEKS, OF NEWARK, NEW JERSEY.

COVER OR STOPPER FOR MILK-CANS, &c.

SPECIFICATION forming part of Letters Patent No. 536,903, dated April 2, 1895.

Application filed July 19, 1894. Serial No. 517,998. (No model.)

*To all whom it may concern:*

Be it known that I, GRENVILLE M. WEEKS, a citizen of the United States, residing at Newark, in the county of Essex and State of New Jersey, have invented new and useful Improvements in Covers or Stoppers for Milk-Cans and other Vessels, of which the following is a specification.

The object of the invention is to provide a stopper for vessels which is adapted to be provided with a refrigerator or cooling source, and to have the heat rapidly driven away from proximity of the cooling source.

The invention consists in the novel features of construction set forth in the following specification and claim, and illustrated in the accompanying drawing.

The drawing shows a sectional elevation of the cover or stopper.

The cover comprises the cover or flange portion 1 adapted to close the vessel, and said cover portion is provided with a cooling chamber 2 carried by the cover portion 1 and adapted to receive ice or suitable cooling or refrigerating medium or mixture. The cover portion has a flange 3.

The cover portion, by being provided with an access opening for the cooling chamber will allow the latter to be properly charged or cleaned, and by providing a suitable stopper or cover 5 for said access opening the contents of chamber 2 will be properly inclosed or protected. The cover 5 is shown with a suitable bail or handle 6, and with a vent 7 leading to the cooling chamber. By suitably jointing or connecting the cover or stopper 5 at 8 to the cover portion 1 and providing a catch or lock 9, the cover 5 can be opened and closed and locked as desired, and will be prevented from becoming detached or lost.

The flange or side 3 of the stopper is readily made to sit about the neck of a milk can or vessel.

The cooling chamber 2, when made to contact centrally with the upper portion of the contents of the vessel to which the cover is applied, will even when of limited capacity exert an efficient cooling influence.

The device can be applied not only to milk cans, but elsewhere, as to water coolers, or for cooling other beverages or substances.

In addition to vent 7, a vent-tube 15 having orifices 16 is provided. When the cooling chamber 2 is thoroughly cooled, or the heat driven out therefrom through vents 7 and 15, the vent 7 may be plugged or closed.

What I claim as new, and desire to secure by Letters Patent, is—

A stopper for a vessel, consisting of a cover portion and a cooling chamber carried by the cover portion and made to extend into the vessel, said cover portion being provided with a vent, and said cooling chamber being provided with a cover and a vent-tube, substantially as described.

In testimony whereof I have hereunto set my hand in the presence of two subscribing witnesses.

GRENVILLE M. WEEKS.

Witnesses:
WM. C. HAUFF,
E. F. KASTENHUBER.